United States Patent [19]
Justice, III

[11] Patent Number: 5,156,570
[45] Date of Patent: Oct. 20, 1992

[54] COMBINE-GRAIN DRYER

[76] Inventor: James C. Justice, III, 302 Mill Stone Dr., Beckley, W. Va. 25803

[21] Appl. No.: 763,567

[22] Filed: Sep. 23, 1991

[51] Int. Cl.⁵ .................. A01D 12/48; F26B 19/00
[52] U.S. Cl. ............................. 460/118; 56/12.2; 34/180
[58] Field of Search ................ 460/118; 56/12.2; 34/86, 180, 182, 183

[56] References Cited

U.S. PATENT DOCUMENTS

| | | | |
|---|---|---|---|
| 2,777,212 | 1/1957 | McOmber | 34/86 |
| 3,096,165 | 7/1963 | Lane | 34/183 |
| 3,581,407 | 6/1971 | Ward et al. | 34/182 |
| 4,003,139 | 1/1977 | Van Winkle | 34/86 |
| 4,021,929 | 5/1977 | Black | 34/54 |
| 4,038,758 | 8/1977 | Miller | 34/48 |
| 4,209,918 | 7/1980 | Klein | 34/182 |
| 4,509,273 | 4/1985 | Roisen | 34/86 |

FOREIGN PATENT DOCUMENTS 0842363  1/1981  U.S.S.R. ................ 34/180

*Primary Examiner*—Terry Lee Melius
*Attorney, Agent, or Firm*—Nixon & Vanderhye

[57] ABSTRACT

A grain harvesting combine drives the grain in the combine vehicle using three separate chambers connected by auger conveyors. The grain is heated in the first two chambers and air is circulated through them to move the moisture away from the grain. The first chamber is preferably heated by a heat exchanger having fluid that is heated by rejected heat from the combine engine, while in the second chamber a hollow body having a diesel or propane burner within it is provided. In the third chamber ambient or cooled air is passed through perforated walls of the chamber to cool the grain before it is discharged through a load out tube auger to a waiting truck.

17 Claims, 3 Drawing Sheets

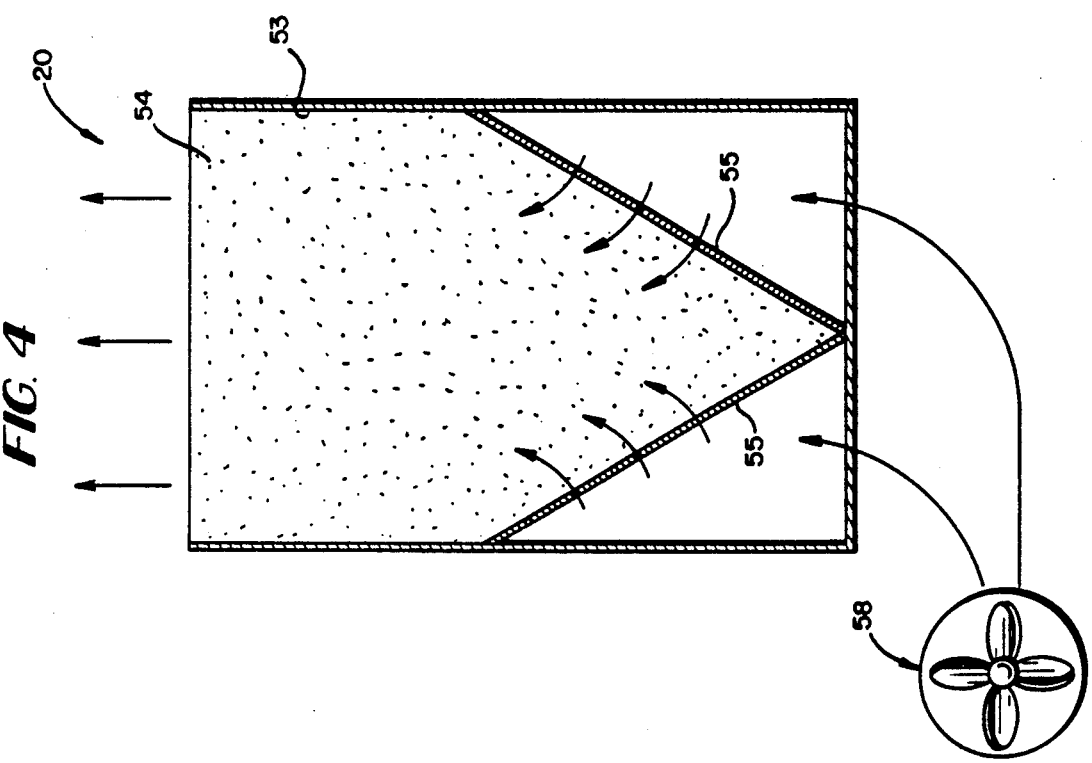
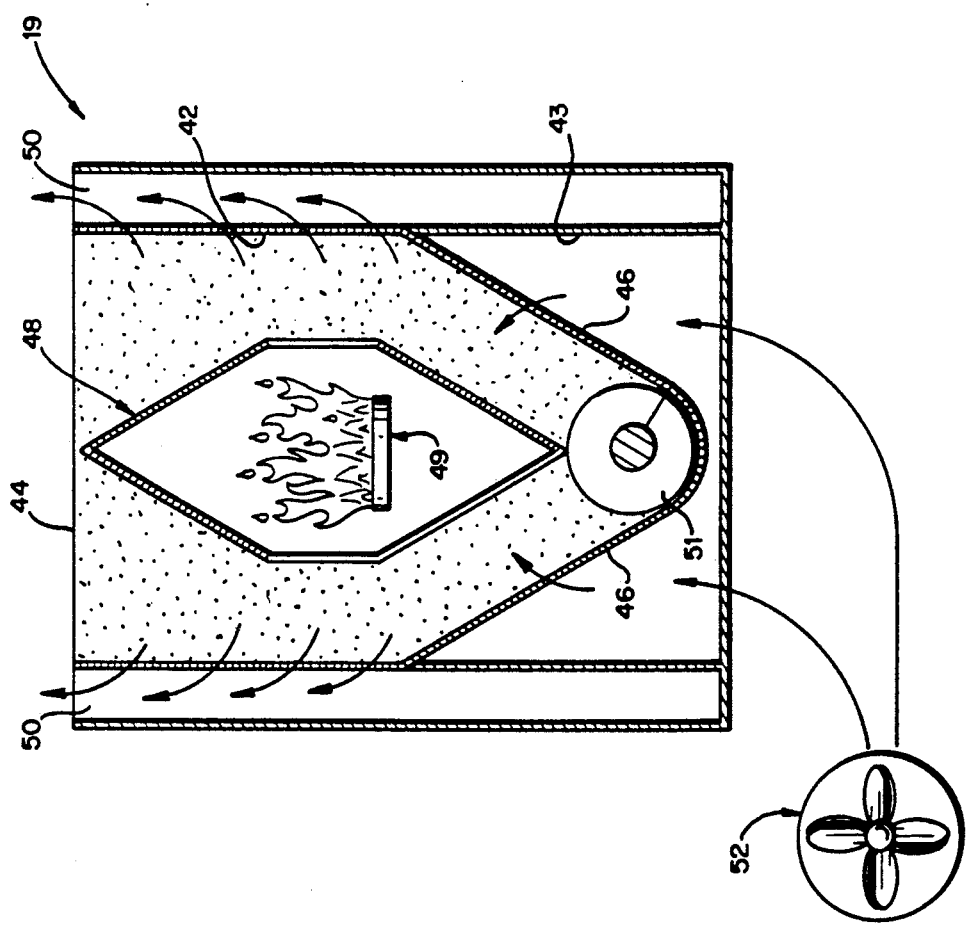

COMBINE-GRAIN DRYER

BACKGROUND AND SUMMARY OF THE INVENTION

Conventional combines, either self propelled or pulled by a tractor, harvest grain and load the grain into a tank. Either the combine is emptied when the tank is full, or a truck moves next to the combine and the grain is unloaded from the combine onto the truck using a load-out tube. The moisture content of the grain coming out of the field is high, often on the order of 18 to 30%. Eventually the unloaded grain is stored by heating it to eliminate excess moisture and cooling it just before storage, the moisture content typically being reduced to around 16% for storage. Ultimately the moisture content before the grain is sold and shipped should be around 14 to 15%.

There have been a number of proposals in the past for effecting drying of the grain right on the combine. These proposals use various mechanisms to effect heating of the grain so as to reduce the moisture content, often using a source of waste heat from the combine internal combustion engine and/or another source of heat. However the prior proposed structures have apparently not been commercially successful, perhaps because they do not carefully enough simulate the drying action that is conventionally practiced, and thereby do not necessarily eliminate subsequent off-vehicle drying steps.

According to the present invention, a combine is provided which effectively treats the grain harvested thereby so that it is properly dried and then cooled before the grain is discharged from the combine into a trailing truck or the like. The combine according to the invention closely simulates conventional grain drying techniques yet accomplishes them on the combine itself, and allows for grain drying and cooling in a cost effective manner.

According to one aspect of the present invention, the drying means associated with the combine comprise first, second and third distinct chambers interconnected by conveyors, such as augers. A fan, or like device, is associated with each of the chambers for circulating air through the chamber to remove moisture from grain disposed within the chamber. A common fan may be provided for circulating air through all of the chambers. The circulating air in the first two chambers picks up heat since those chambers are heated, while the air in the third chamber is either ambient or cooled air which merely removes heat from the grain—along with associated moisture—and rejects it into the atmosphere.

The first chamber of the combine according to the invention includes one or more perforated walls which have heat exchanger tubes associated with them, the heat exchanger tubes being either connected up to the radiator of the combine engine, or to the exhaust gas manifold. In the second chamber, a hollow body is provided within the chamber. The hollow body includes a burner for hydrocarbon fuel, such as diesel or propane. In the third chamber, the air passes through the perforated walls at the bottom and picks up moisture as it moves to a vent at the top, no heat being added. From the third chamber the grain is discharged by a load out auger tube or the like.

It is the primary object of the present invention to provide effective on-vehicle drying of grain harvested by a combine. This and other objects of the invention will become clear from an inspection of the detailed description of the invention, and from the appended claims.

BRIEF DESCRIPTION OF THE DRAWINGS

FIGS. 2 through 4 are schematic cross-sectional views taken along lines 2—2, 3—3, and 4—4, respectively, of FIG. 1.

DETAILED DESCRIPTION OF THE DRAWINGS

Figure 1:
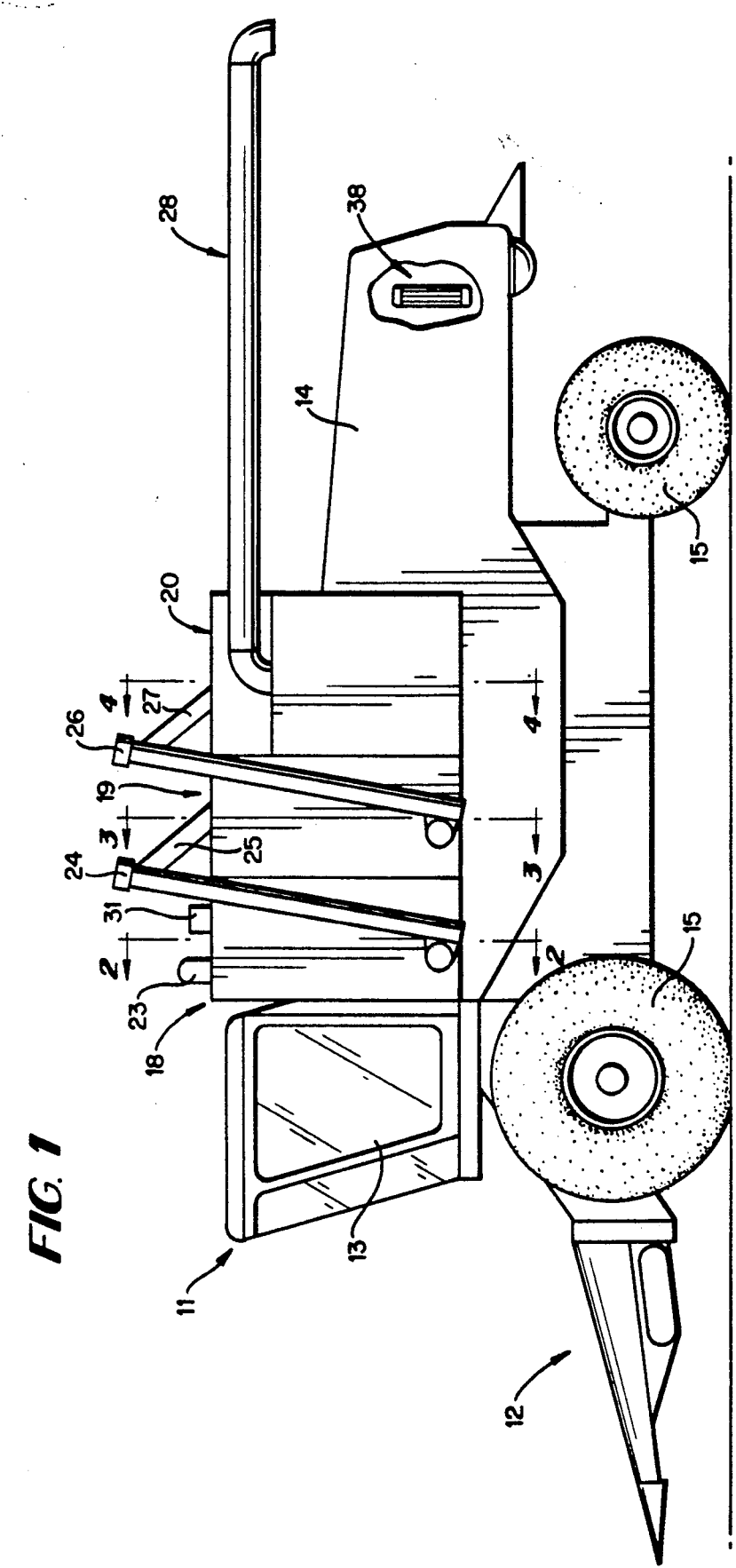
FIG. 1 is a side schematic view, with a portion cut away for clarity of illustration, of an exemplary combine according to the invention.

A combine according to the invention is shown generally by reference numeral 11 in FIG. 1. The combine has conventional cutting apparatus 12, a cab 13, and a frame 14, and is mounted on wheels 15 which are powered by an internal combustion engine contained within the frame 14, as is conventional. Grain which is harvested by the combine is sequentially passed into three different chambers mounted by the frame 14, a first chamber 18 (FIGS. 1 and 2), a second chamber 19 (FIGS. 1 and 3), and a third chamber 20 (FIGS. 1 and 4). The chambers 18 through 20, and associated structures, comprise means for drying grain harvested by the combine.

Figure 2:
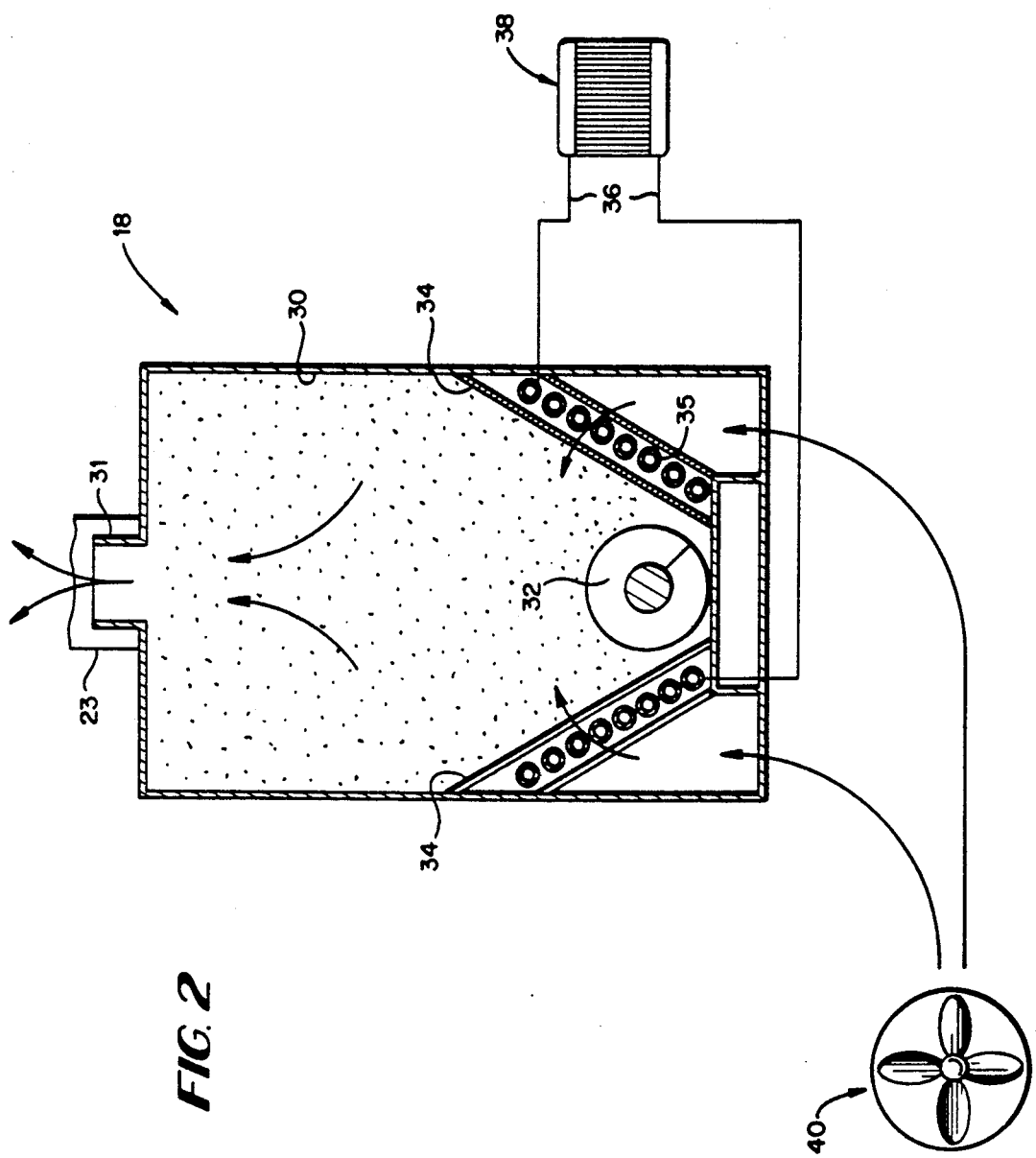

The first chamber 18, seen most clearly in FIG. 2, has a grain inlet conduit 23 at the top thereof. An auger, or other conveyor, can be associated with the conduit 23 for conveying harvested grain directing into the top of the first chamber 18.

A first conveyor—such as an auger—disposed within the tube 24 conveys grain from the first chamber 18 to the second chamber 19, leg 25 thereof leading into chamber 19. A second conveyor, such as an auger disposed within the tube 26, conveys grain from the second chamber 19 to the third chamber 20, leg 27 leading into chamber 20. As seen in FIG. 1, a load-out tube auger 28 is preferably provided, swivelably mounted on the frame 14 and operatively connected to the third chamber 20, for discharging dried grain externally of the combine from the third chamber 20 (e.g. into a waiting truck).

The first chamber 18 (see FIG. 2) is defined by walls 30, and preferably has a vent 31 at the top thereof distinct from the inlet 23, the vent 31 for the discharge of moisture and heat laden gas (air) which passes through the chamber 18 as illustrated by the arrows in FIG. 2. Disposed at the bottom of the chamber 18 is a first conveying means, preferably an auger 32, which conveys grain from the first chamber 18 into the conveyor tube 24.

As illustrated in FIG. 2, the bottom portions of the chamber 18, below the walls 30, preferably are defined by one or more (e.g. two) perforated wall members 34. As illustrated in FIG. 2, the perforated wall members 34 preferably slant downwardly at an angle, being spaced further apart at the top than at the bottom thereof, with the auger 32 disposed between them. The inner surfaces of the wall members 34 engage grain within the first chamber 18, while located exteriorly of the perforated wall members 34 are the heat exchanger tubes 35. The tubes 35 of the heat exchanger are operatively connected to a waste heat fluid from the internal combustion engine of the combine 11. As illustrated in FIG. 2, preferably tubes 35 are connected by conduits 36 to the radiator 38 of the internal combustion engine of the combine 11, so that the waste heat in the cooling water within the internal combustion engine is circulated through the tubes 35, heating air that passes past the tubes 35 through the perforated wall members 34, and at the same time heating the wall members 30, 34 by conduction.

A fan 40, or like air moving means, is provided for circulating air through the first chamber 18 to remove moisture from grain disposed within the chamber 18. As illustrated in FIG. 2, air from the fan 40 passes past the heat exchanger tubes 35, through the perforated wall members 34, and then through the grain, withdrawing moisture from the grain which is discharged along with the air through the vent 31.

The second chamber 19—as illustrated in FIG. 3—effects further heating of the grain, to facilitate further drying thereof. The chamber 19 has upper side wall portions 42 which are perforated, and lower side wall portions 43 which are solid, and preferably a closed top 44. Bottom slanted interior wall members 46 are also perforated to provide for air introduction through the bottom. Located within the interior of the chamber 19 is the hollow body 48, of metal or like heat conducting material. Preferably at least the bottom slanted portions of the hollow body 48 are perforated so that heated air from within the body 48 may flow through the grain. Disposed within the body 48 is a burner 49 or like structure for combusting hydrocarbon fuel, such as diesel or propane, for heat. The grain in contact with the body 48 is heated both by conduction and by convection.

A conveyor, such as an auger 51, is provided at the bottom of the second chamber 19. Grain is introduced into the top of the second chamber 19 through the leg 25 (see FIG. 1) of the first conveyor 24, and then is discharged from the bottom thereof by the auger 51 directly into the bottom of the second conveyor tube 26.

Air is circulated through the first chamber 19 by the fan 52, or like circulating means. The fan 52 may be a separate fan for the chamber 19, or may be the same fan as the fan 40 associated with the first chamber 18. The fan 52 causes ambient air to pass through the slanted perforated wall members 46, into contact with the grain, removing moisture from the grain as the air passes through the wall members 42 and then out the channels 50 between the exterior walls of the chamber 19 and the interior walls 42, 43.

The third chamber 20 according to the invention as illustrated in FIG. 4 is fed with grain from the top through the leg 27 of the second conveyor tube 26. This third chamber comprises means for cooling the grain which has been heated in the first two chambers 18, 19, and additionally further effects drying thereof by removing moisture with cooling air that is circulated therethrough. The chamber 20 is defined by the solid side walls 53 and has an open vented top 54. The bottom is defined by the slanted wall members 55 which are perforated and positioned so that they are further apart at the tops than at the bottom thereof.

Ambient or cooled air is circulated by the fan 58 through the perforated bottom wall members 55 of chamber 20, and then through the grain and out the open top 54 of the third chamber 20. The fan 58 may be a separate fan associated with the chamber 50 (which is necessary if cooled air is to be used), or may be the same fan as the fans 40, 52 associated with the first and second chambers 18, 19, respectively. Once the grain has been cooled in the third chamber 50 it is discharged therefrom by the conventional load out-tube auger 28.

The perforations in the wall members 34, 42, 46, 48 and 55 are large enough to allow free air flow therethrough, but small enough to prevent grain from passing through, or even getting stuck in them.

The invention is capable of reducing the moisture content of harvested grain to 16% or less, so that it may be directly stored, yet is not stored or transported in heated condition, having been properly cooled before storage.

In a typical operation utilizing the combine 11 according to the invention, grain is harvested by the cutting mechanism 12, and is conveyed by the conveyor tube 23 to the top of the first chamber 18. Heated water from the radiator 38 of the combine internal combustion engine circulates through the heat exchanger tubes 35, heating the grain in the first chamber 18, while the air circulating under the influence of fan 40 through the perforated wall members 34 facilitates heating of the grain and removes the moisture therefrom through the vent 31.

From the bottom of the first chamber 18 the grain is conveyed by the auger 32 into the first conveyor tube 24, from which it is conveyed—via leg 25—into the top of the second chamber 19. Diesel or propane burning within the hollow body 48 heats the grain within the second chamber 19 by convection and conduction, and ambient air circulating under the influence of fan 52 passes through perforated wall members 46 and 42 to pick up the moisture from the grain within the second chamber 19 and discharge it through the passageways 50.

The heated grain at the bottom of the second chamber 19 is transported by the auger 51 into the second conveying means—auger tube 26—from which it is discharged, through leg 27, into the top of the third chamber 20. In the third chamber 20 ambient or cooled air passes through the wall members 55, and passes through the grain within the chamber 20, cooling the grain and withdrawing moisture from it which is vented through the open top 54. The dried, cooled, grain is then discharged into a waiting truck by the load out-tube auger 28.

It will thus be seen that according to the present invention a simple yet effective combine which is capable of drying harvested grain right on the combine frame and in a cost effective manner has been provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A grain harvesting combine having an internal combustion engine, and a frame, and comprising:
    means for drying grain harvested by said combine, and mounted on said combine frame;
    said drying means comprising at least first, second, and third distinct chambers interconnected by conveying means, including a first conveying means for connecting said first and second chambers together, and a second conveying means for connecting said second and third chambers together;

means associated with each of said chambers for circulating air therethrough to remove moisture from grain disposed within each of said chambers;

means for discharging dried grain externally of said combine from said third chamber; and means for heating said first and second chambers, and means for cooling said third chamber, said means for heating said first chamber comprising a heat exchanger disposed adjacent at least one perforated wall portion of said first chamber; and wherein said means for circulating air in said first chamber comprises means for circulating air past said heat exchanger, through said perforated wall portion, and in and through the grain in said first chamber.

2. A combine as recited in claim 1 wherein said heat exchanger is connected to a source of waste heat from said internal combustion engine.

3. A combine as recited in claim 1 wherein said means for heating said second chamber comprises an internal hollow body disposed within said second chamber, and having means for combusting hydrocarbon fuel therein; and wherein said means for circulating air through said second chamber circulates air past said hollow body and through grain surrounding said hollow body.

4. A combine as recited in claim 3 wherein said third chamber comprises at least one perforated lower wall member defining said chamber, and a vent at the top thereof; and wherein said cooling means and said means for circulating air through said third chamber comprises means for circulating ambient or cooled air through said perforated lower wall member to cool grain in said third chamber and carry with it heat and moisture which vents through said vent at the top of said chamber.

5. A combine as recited in claim 1 wherein said first and second conveying means comprise augers.

6. A combine as recited in claim 1 wherein said means for discharging dried grain comprises a load out tube auger mounted for swinging movement with respect to said combine frame.

7. A combine as recited in claim 3 wherein said second chamber hollow body is defined in part by perforated wall members mounted in said second chamber so that heated air passes through said perforated wall members into surrounding grain.

8. A combine as recited in claim 1 wherein each of said chambers comprises a pair of slanted perforated wall members at the bottom thereof, said wall members being closer together at the bottoms thereof than at the tops thereof; and wherein said means for circulating air comprises a fan for circulating ambient air through the perforated wall members of each of said chambers.

9. A combine as recited in claim 2 wherein said internal combustion engine comprises a radiator; and wherein said heat exchanger comprises a plurality of metal tubes disposed at a slant to the vertical adjacent said at least one perforated wall member of said first chamber, said tubes being connected up to said radiator.

10. A grain harvesting combine having an internal combustion engine, and a frame, and comprising:

means for drying grain harvested by said combine, and mounted on said combine frame;

said drying means comprising a first chamber mounted on said frame and having a top and bottom; said first chamber having a grain inlet opening adjacent the top thereof, a vent adjacent the top thereof, and conveying means adjacent the bottom thereof;

said first chamber defined in part by at least one perforated wall member having an internal face adapted to engage grain within said first chamber, and an external face;

heat exchange means mounted adjacent said perforated wall member external face;

means for circulating a hot fluid within said heat exchange means; and means for circulating air so that it flows past said heat exchange means and through said perforated wall member and then to said vent, to gain heat by contacting said heat exchange means, to remove moisture from the grain in the first chamber by contacting it, and then to be expelled through said vent.

11. A combine as recited in claim 10 wherein said at least one perforated wall member comprises first and second wall members slanting with respect to the vertical, and spaced from each other, with the bottoms thereof closer together than the tops thereof.

12. A combine as recited in claim 10 wherein said internal combustion engine includes a water circulating radiator, and wherein said means for circulating a hot fluid through said heat exchanger comprises conduits connecting said radiator to said heat exchanger.

13. A combine as recited in claim 10 further comprising another chamber operatively connected to said first chamber for receiving grain heated in said first chamber, and means for directing cooling fluid into the grain disposed in said another chamber.

14. A grain harvesting combine having an internal combustion engine, and a frame, and comprising:

means for heating grain harvested by said combine to facilitate removal of moisture therefrom, and mounted on said combine frame;

means for cooling grain heated by said heating means, and mounted on said combine frame;

conveyor means interconnecting said grain heating and cooling means for continuously passing heated grain to said cooling means;

said heating means including means for utilizing rejected heat from said engine to heat grain;

said cooling means comprising means for passing ambient or cooled air through heated grain to cool the grain and assist in removing moisture therefrom;

said cooling means includes a chamber containing grain through which air is passed; and a load-out tube auger swingably mounted with respect to said combine frame and connected to said chamber for discharging grain from said chamber externally of said combine.

15. A combine as recited in claim 14 wherein said heating means includes a chamber having a pair of slanted perforated walls with internal surfaces engaging grain, and exterior surfaces; and a heat exchanger disposed adjacent said walls exterior surfaces, and operatively connected to a source of rejected heat from said engine.

16. A combine as recited in claim 14 wherein said heating means further comprises a chamber containing grain, and a hollow metal body disposed in said chamber, said body defined by metal surfaces at least one of which is perforated; and a hydrocarbon fuel combustion source mounted within said hollow body.

17. A combine as recited in claim 14 wherein said heating and cooling means include three distinct chambers, and means for circulating ambient air into each of said chambers, the ambient air being heated by an external source of heat within two of said chambers, and not being heated within the third chamber except by the hot grain within the third chamber.

* * * * *